G. D. LUCE.
TRASH CUTTER.
APPLICATION FILED JULY 15, 1919.
1,419,158.
Patented June 13, 1922.
2 SHEETS—SHEET 1.
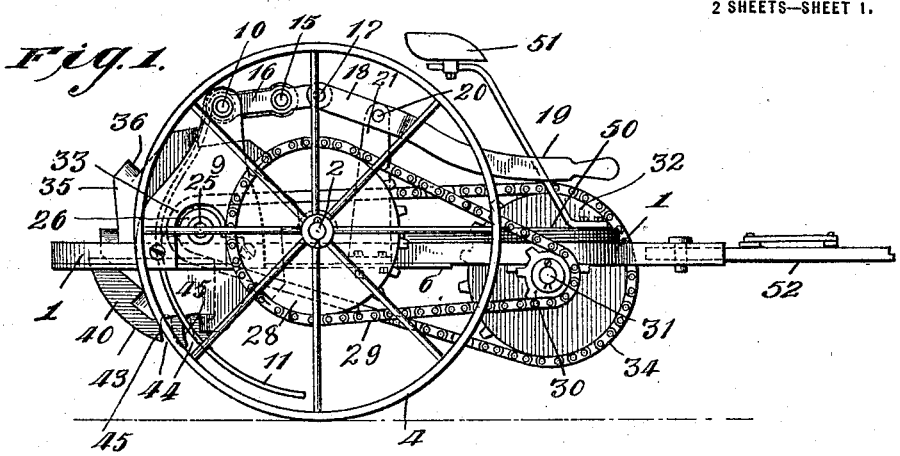
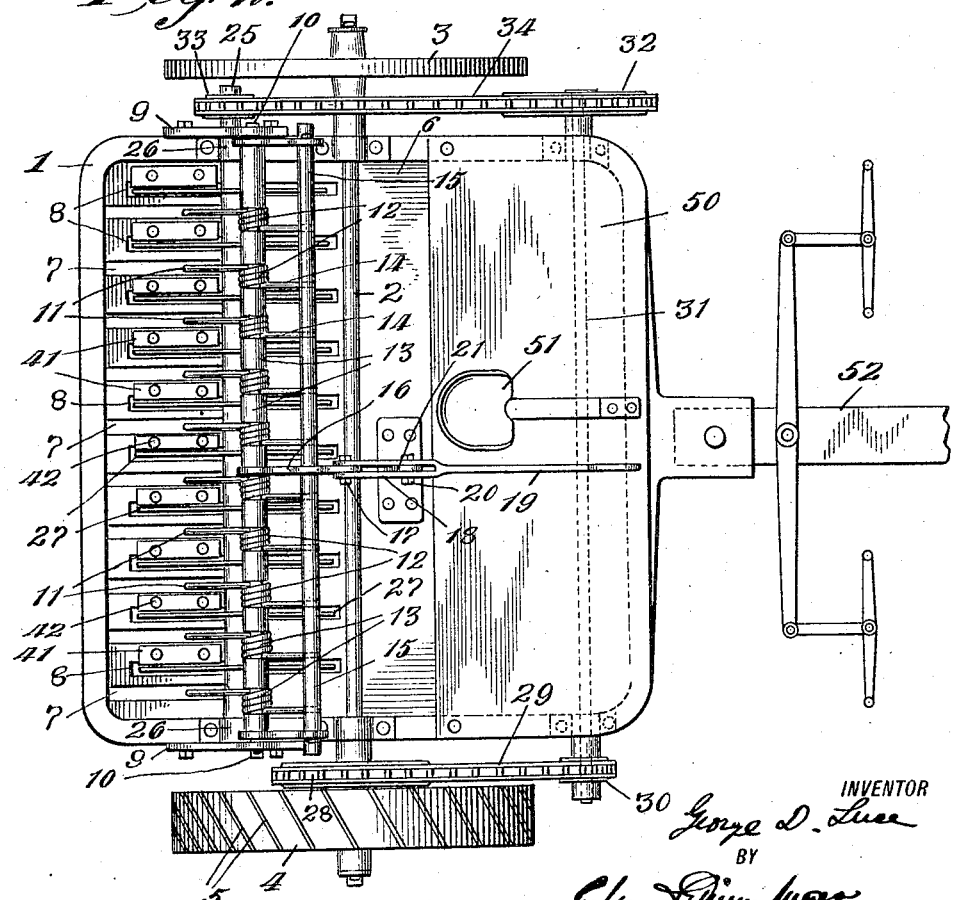
INVENTOR
George D. Luce
BY
ATTORNEY

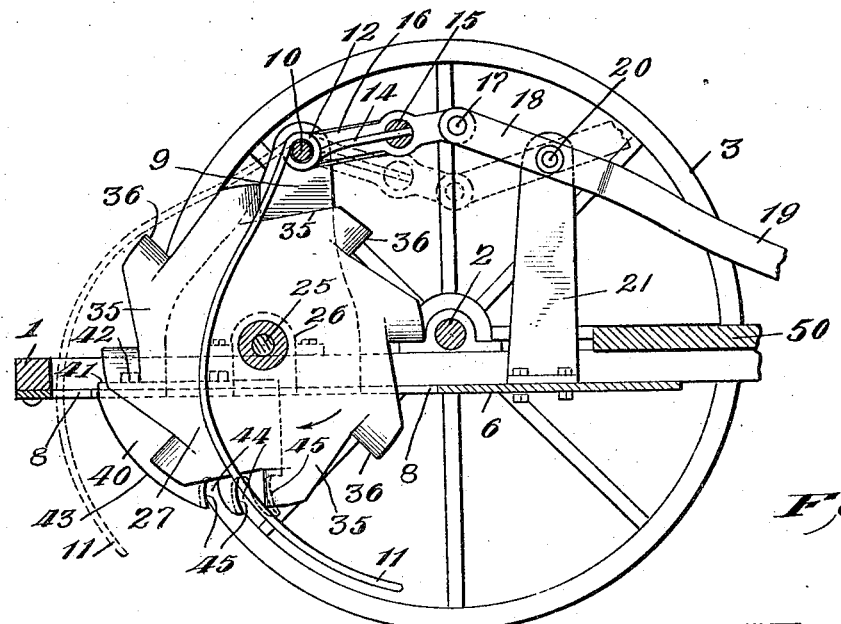
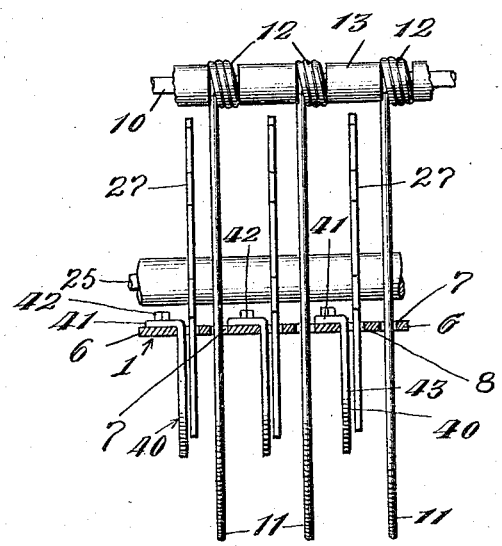

UNITED STATES PATENT OFFICE.

GEORGE D. LUCE, OF WATERTOWN, WISCONSIN.

TRASH CUTTER.

1,419,158.  Specification of Letters Patent.  Patented June 13, 1922.

Division in part of application Serial No. 241,099, filed June 21, 1918. This application filed July 15, 1919. Serial No. 310,936.

*To all whom it may concern:*

Be it known that I, GEORGE D. LUCE, a citizen of the United States, residing at Watertown, county of Jefferson, and State of Wisconsin, have invented certain new and useful Improvements in Trash Cutters, of which the following is a specification.

In the harvesting of certain crops especially sugar cane crops, a large amount of trash comprising the strippings from the cane and the tops severed from the upper ends of the stalks accumulate, and the problem of the disposal of this material is especially marked where sugar cane harvesting machinery is used which automatically strips the cane and tops it as the harvester travels across the field, the trash being dumped on the ground behind the machine where it forms a tangled covering difficult to do anything with. Ordinarily this trash is of value chiefly as a fertilizer and to utilize it in this manner as well as to get rid of it, it is desirable to plow it into the soil where it will rot and enrich the field. Owing to the fact that much of this trash is in the form of long leaves or strippings it has proved very difficult to handle and much trouble is experienced in any attempt to plow it into the ground.

The present invention relates to means for cutting up this trash into short lengths which may be readily plowed into the soil or which may be conveniently deposited upon a conveyor or gathered up in any suitable manner in cases where it is not desired to plow it into the ground.

The invention includes improved means for lifting the trash, cutting it and depositing it upon the ground or upon any suitable means which may be provided to receive it.

For the purpose of illustrating the nature of my invention and a preferred mode of practicing the same I have illustrated one specific form of apparatus which may be utilized in carrying out the invention.

In the accompanying drawings which form a part of this specification,

Figure 1 is a side elevation of the specific example of the apparatus referred to;

Figure 2 is a plan view of the same;

Figure 3 is a vertical longitudinal section of the apparatus;

Figure 4 is a detail view from the rear showing the arrangement of rake teeth and cutters, the horizontal shield of the machine being shown in section.

Referring to the drawings in detail, the numeral 1 designates a horizontal frame mounted on a transverse axle 2 having at its ends the wheels 3 and 4. The axle is preferably connected to the frame near the center thereof so that the frame and the mechanisms carried thereon will be nearly balanced upon the axle. One or both of the wheels, as shown the wheel 4 only, is preferably in the form of a traction wheel or "bull-wheel" having ground-engaging cleats 5 so as to be positively rotated as the apparatus is moved across the field, for the purpose of furnishing power to drive the cutting mechanism as will be hereinafter explained. Extending across a part of the frame is a plate or shield 6 having a series of narrow slots 7 therein, and also having a second series of slots 8 paralleling the slots of the first series and preferably extending somewhat forward of the slots of the first series. At each side of the frame is mounted an upright 9 and supported between the upper ends of these uprights is a pivot bar 10 on which are pivoted a plurality of curved, preferably more or less flexible, rake teeth 11 which are somewhat similar to the teeth of a hay rake. Each tooth is preferably provided with a spring coil 12 surrounding the bar 10 and providing a pivotal support for the tooth, as well as increasing the resilience of the same. The coils may be kept properly spaced by the use of a plurality of spacing sleeves 13 strung upon the pivot bar 10 between the successive teeth. The teeth are extended beyond the coils to provide arms 14 which are attached at their free ends to a rake bar 15. Means are preferably provided by which the operator may adjust the position of this rake bar and thereby bring the rake teeth either into an operative position in which their points travel close to the ground, or into an inoperative position, as shown in dotted lines in Figure 3. The means shown for this purpose comprise a link 16 having a hole between its ends through which the rake bar 15 passes and pivotally mounted at its rear end upon the pivot bar 10. At its forward end this link is pivoted as indicated at 17 between the arms 18 of a forked hand lever 19, the handle end of which is located in position to be conveniently grasped by the operator. The lever 19 is pivoted between its ends as indicated at 20, to a standard 21 mounted near the front edge of the plate or shield 6. In the construction shown the parts are so arranged that the rear part of the hand lever 19 and the link 16 constitute a toggle adapted, when the handle end of the lever is depressed and the pivot 17 raised above the dead center, to hold the rake teeth in operative position, while when the handle end of the lever is raised so as to move the pivot 17 to the other side of the dead center then the rake teeth are automatically locked in inoperative position. The parts are so constructed as to permit sufficient yielding to allow the pivot 17 to pass the dead center. In the construction shown this is accomplished by reason of the flexibility or resiliency of the forward edge of the plate 6, which is preferably made of metal, this resiliency permitting the standard 21 to yield slightly when the hand lever is moved. Any other suitable means may be utilized for controlling the rake, but the means described are very simple and effective.

The devices which do the actual cutting up of the trash include preferably a series of rapidly rotated cutters and a series of fixed cutters adapted to cooperate with the rotary cutters. In the construction shown the cutter shaft 25 is journaled in bearings 26, at each side of the frame, and on this shaft are mounted a series of sharpened rotary cutters or saws 27, there being preferably one saw between each pair of rake teeth. For rotating the cutter shaft and saws power derived from the bull-wheel 4 is preferably employed, any suitable gearing being utilized for transmitting the power, such, for instance, as the sprocket 28 attached to the bull-wheel which is connected by means of the chain 29 with the sprocket 30 on the jack shaft 31, the latter having at its opposite end a large sprocket 32 which is connected with a smaller sprocket 33 on the end of the cutter shaft by means of the chain 34. By the arrangement shown a considerable multiplication of speed is obtained so that the cutter shaft will be rapidly rotated. The saws or cutters 27 may be of any suitable construction, but preferably have a limited number of prominent teeth 35 thereon, the forward edges 36 of said teeth being preferably substantially radial, the teeth being beveled off at one side so as to give such edges a knife-like character. The saws are preferably rotated in the direction indicated by the arrow in Figure 3 so that the cutting edges when below the axis of the cutter shaft approach the rake teeth from the front. To cooperate with the rotary cutters in cutting up the trash I preferably provide a series of stationary abutment or cutter members 40. These are preferably formed of flat metal bent over along their upper edges to provide flanges 41 which are secured to the upper side of the plate or shield 6 by bolts 42, the cutter members projecting downwardly through the slots 8 close to the respective cutters or saws 27, one of which also projects through each of the slots 8. The stationary cutters are preferably of a general sector shape as shown, having the smooth upwardly and rearwardly curved rear edges 43 which provide strength for the cutters and at the same time will not catch the cut-up trash, the forward parts of the stationary cutters being provided with one or more cutting edges. Preferably a plurality of cutting edges are provided on each cutter, the latter being shown as formed with a plurality of notches 44 the rear edges of which are sharpened so as to provide a plurality of sharpened forwardly facing longitudinally spaced cutting edges 45. One or more of these edges are preferably located in advance of the rake teeth so as to cooperate with the cutting edges of the rotary cutters to cut up the trash in front of the rake teeth, while the remaining edges of the stationary cutters are located in rear of the rake teeth where they will catch any trash which has been dragged between the rake teeth, without being properly cut and will engage any trash when the rake teeth may have been forced backwards, out of their normal working position, by reason of an obstruction on the ground, and thus insure the severing of trash without permitting the same either to fall on the ground in an uncut condition or to become entangled in the apparatus. In this way a very thorough and effective cutting up of the trash is obtained, the arrangement being especially suitable for handling the tangled mass of green leaves, tops, etc. constituting trash from sugar cane.

In operation it will be understood that as the apparatus is moved along the ground the rake teeth engage the trash lying thereon, which slides up the curved surfaces of the teeth until it is brought between the cutting edges of the fixed and movable cutters which sever the trash and permit it to fall back upon the ground or upon any suitable means which may be provided to receive it. As the shield or plate 6 has narrow slots therein of only sufficient width to permit the rake teeth and cutters to project through the same, the trash is stopped from passing higher than this shield and is thereby prevented from getting tangled in the mechanism.

In the construction illustrated the shield 6 is provided with an operator's platform 50 upon which is mounted a seat 51 and the apparatus is provided with a tongue 52 for the attachment of draft animals. It will be understood, however, that the apparatus may, if desired, be utilized as a trailer for a harvester or the like or may be otherwise suitably propelled.

This application is a division in part of my application, Serial No. 241,099, filed June 21, 1918.

While I have shown in the drawings and described in detail one preferred embodiment of my invention, it will be understood that modifications may be made therein, and I do not therefore intend to limit myself to the specific structure illustrated, but intend to cover my invention broadly in whatever form its principle may be embodied.

Having thus described my invention, what I claim is:—

1. In apparatus of the character described, the combination of a plurality of yielding rake teeth forwardly directed towards their lower ends where they approach the ground surface, rotary cutters arranged adjacent to said teeth, stationary cutters co-operating with said rotary cutters and a shield through which the said teeth and cutters project for preventing material picked up by said teeth from being carried up the same by said rotary cutters.

2. In apparatus of the character described, the combination of a plurality of yielding rake teeth forwardly directed towards their lower ends where they approach the ground surface, rotary cutters arranged adjacent to said teeth, stationary cutters adjacent to said rotary cutters, and a shield to which said stationary cutters are secured and through which the said teeth and rotary cutters project for preventing material picked up by said teeth from being carried up the same by said rotary cutters.

3. In apparatus of the character described, the combination of a frame, supporting wheels secured thereto, a substantially horizontal sheet metal shield secured to said frame and provided with slots, a plurality of rake teeth pivotally supported above said shield and projecting downwardly through certain of the slots therein, a plurality of rotary cutters journaled on said frame and projecting through certain of the slots in said shield, and stationary cutters supported by said shield and adapted to cooperate with said rotary cutters.

4. In apparatus of the character described, the combination of a frame, supporting wheels secured thereto, a substantially horizontal sheet metal shield secured to said frame and provided with slots, a plurality of rake teeth pivotally supported above said shield and projecting downwardly through certain of the slots therein, a plurality of rotary cutters journaled on said frame above said shield and projecting through certain of the slots in said shield, and stationary cutters supported by said shield and projecting downwardly through the slots through which the rotary cutters project and adapted to cooperate with said rotary cutters.

5. In apparatus of the character described, the combination of a plurality of rake teeth for lifting up the trash from the ground surface, a plurality of rapidly rotated saws and a plurality of stationary cutters associated therewith for cutting the trash when lifted up by said rake teeth, each of said stationary cutters being formed to provide a plurality of spaced cutting edges.

6. In apparatus of the character described, the combination of a plurality of rake teeth for lifting up the trash from the ground surface, a plurality of rapidly rotated saws and a plurality of stationary cutters associated therewith for cutting the trash when lifted up by said rake teeth, each of said stationary cutters being formed to provide a plurality of spaced cutting edges, some of said edges being located in advance of and some in rear of said rake teeth.

7. In apparatus of the character described, the combination of a plurality of rotary cutters and a stationary cutter located alongside of each rotary cutter and cooperating therewith, said stationary cutters being of sector shape and having a series of notches in the forward lower part thereof to provide spaced cutting edges.

8. In apparatus of the character described, a frame, pivot bars supported above the same, a plurality of spring rake teeth having their upper ends coiled about said pivot bar and projecting forwardly of the same, a rake bar connected to said forwardly projecting ends, means for adjusting the position of said rake bar and rotary cutters mounted adjacent to said teeth.

9. In apparatus of the character described, a series of cutters mounted to rotate around a horizontal axis, a series of rake teeth extending downwardly between said cutters, and means for adjusting said rake teeth, comprising an element to which said teeth are connected, and a hand lever connected to said element by a toggle device adapted to be moved to one side or the other of a dead center to hold said teeth in either operative or inoperative position.

10. In apparatus of the character described, a frame, pivot bars supported above the same, a plurality of spring rake teeth having their upper ends coiled about said pivot bar and projecting forwardly of the same, a rake bar connected to said forwardly projecting ends, means for adjusting the position of said rake and rotary cutters mounted adjacent to said teeth, the means for adjusting said rake teeth including a link pivoted at one end upon said pivot bar and connected between its ends with said rake bar, and a yieldingly mounted hand lever pivoted to the free end of said link.

GEORGE D. LUCE.